United States Patent [19]
Barbu et al.

[11] Patent Number: 4,815,026
[45] Date of Patent: Mar. 21, 1989

[54] SLAVE-TYPE INTERFACE CIRCUIT

[75] Inventors: Stefan Barbu, Caen, France; Léonardus Valkestijn; van de Kerkhof, both of Eindhoven, Netherlands

[73] Assignee: U.S. Philips Corp., New York, N.Y.

[21] Appl. No.: 112,016

[22] Filed: Oct. 20, 1987

Related U.S. Application Data

[63] Continuation of Ser. No. 736,593, May 20, 1985, abandoned.

[30] Foreign Application Priority Data

Jun. 8, 1984 [FR] France ................................. 84 09063

[51] Int. Cl.⁴ ............................................. G06F 13/00
[52] U.S. Cl. ..................................................... 364/900
[58] Field of Search ... 364/200 MS File, 900 MS File; 340/825.07, 825.52; 370/85, 92, 93

[56] References Cited

U.S. PATENT DOCUMENTS 3,889,236 6/1975 Herger et al. ..................... 364/200

FOREIGN PATENT DOCUMENTS 0051332 12/1982 European Pat. Off. .

Primary Examiner—Gareth D. Shaw
Assistant Examiner—Jonathan C. Fairbanks
Attorney, Agent, or Firm—Thomas A. Briody; Leroy Eason; Algy Tamoshunas

[57] ABSTRACT

A slave-type interface circuit which can receive signals from a bus if the coding $A_0$, $A_1$ and $A_2$ of its inputs $S_0$, $S_1$ and $S_2$ corresponds to that mode of operation. The signals from the bus are then delivered to the inputs $L_1$ and $L_2$. With another mode of operation the coding of inputs $S_0$, $S_1$ and $S_2$ corresponds to off-line operation on the basis of logic levels applied to the same inputs $L_1$ and $L_2$. A branching block (SBL) directs the signals from the inputs $L_1$ and $L_2$ either to a bus receiver RBUS or directly to a decoder CDEC controlling a group of switches (COM). In the case of operation with a bus, the bus receiver (RBUS) controls the logic for the progress for operations.

18 Claims, 4 Drawing Sheets

SLAVE-TYPE INTERFACE CIRCUIT

This is a continuation of application Ser. No. 736,593, filed May 20, 1985, now abandoned.

BACKGROUND TO THE INVENTION

The invention relates to a slave-type interface comprising a first input for attaching to an interconnection bus to therefrom receive information signals and clock signals, said circuit comprising register means for receiving said information signals and output means for outputting information signals received to a user device.

A circuit of this kind is known from the European Pat. No. 51332 in the name of N. V. Philips' Gloeilampenfabrieken published on Apr. 11, 1984, in the form of a station addressable notably as a master or as a slave, and employed in a two-wire, series-type bus system.

The circuit in question is commercially published as the I$^2$C system, which is well adapted to communicate control data between multiple stations of simple construction. Such stations could be programmable subsystems in consumer apparatus such as television sets, video recorders and players for the "Compact Disc" system for playing optically interrogatable storage discs for high-quality audio storage. The invention is not limited, however, to the use in these applications and is neither limited to the specific I$^2$C protocol.

SUMMARY OF THE INVENTION

The provision of bus interfaces for various subsystems, integrated circuits or board mounted subsystems, represents an extensive development effort. Existing circuits are controlled directly, i.e. they are not addressable in the way customarily known for bus systems, but receive the control signals along dedicated interconnections. Novel circuits are developed, which would benefit from such bus addressing set up, in which they would be selectively controlled as slave stations to a master, for example a microprocessor. Therefore, newly developed circuits would have such a bus interface. A problem exists in that these newer circuits, although of possibly superior performance, and/or greater cost effectiveness (e.g. through increased integration level) could not be used in conventional configurations, where control is effected by the mentioned dedicated lines. The invention realizes that the so-developed circuits would gain wider use and acceptance, and through economies-of-scale would become still less expensive, if only they were useable both in the conventional and in the bus-organized systems. It is an object of the invention to allow a circuit to have both a bus interface and an interface for direct control without an extension of the number of external electrical connections and with an easy programmability for the two types of use cited. The object is realized according to the invention by a slave-type interface circuit having a first input for attaching to an interconnection bus to therefrom receive information signals and clock signals, said circuit comprising register means for receiving said information signals, memory means connectable to said register means therefrom receiving and storing selected information signals, and output means connectable to said memory for under control of said selected information signals outputting a plurality of switch control signals in parallel, said circuit furthermore comprising:

a plurality of address inputs for permanently receiving a predetermined address;

a function decoder connected to said address inputs for identifying whether said address corresponds to a first state of operation or to a second state of operation, and for outputting a control selection signal;

a selection block logic having a second input for receiving said control selection signal for selectively routing signals received on said first input to a first output or to a second output, wherein said first output is connected to said register means for in said first state thereto forwarding address elements for addressing the circuit and data elements to be selectively forwarded to said memory means;

a control decoder having a third input connected to said memory means and a fourth input connected to said second output for in said second state directly receiving signals arriving at said first input as control signals, and having a plurality of outputs representing said output means;

and a blocking circuit having a fifth input connected to an output of said memory means, a sixth input for receiving said control selection signal and a third output connected to said control decoder for in said first state transmitting said selected information signals from said memory means but in said second state inhibiting this transmission.

FURTHER ASPECTS OF THE INVENTION

The circuit according to the invention may be rendered inactive by means of a second series of logic gates inhibiting the passage of the logic signals available at the output of the first decoder towards the channels to be switched in the presence of a logic signal called the interface-circuit "off" signal.

The circuit can be initialized by means of a pulse generator which, when the circuit is made live, produces a pulse causing the initialization of the memory and of at least a part of the register.

CIRCUITRY OF THE INVENTION

In a preferred form of embodiment, the circuit is such that in its first state it operates with a series bus wherein the register is a shift register receiving in series at an input located at an upstream end series logic information provided by bus in the form of cycles each presenting at least one sequence and synchronized by a clock signal provided by the bus when the circuit is in its first state, and producing at an output located at a downstream end an end-of-sequence acceptance signal introduced at the input of a first control flip-flop timed by the said clock signal and whose output times a second control or pointer flip-flop whose inverted output is looped on its input, by the fact that the presence of a logic level 1 at the output of the first flip-flop and at the inverted output of the pointer produces an initialisation of the said register, e.g. by setting its first flip-flop to the "1" state and resetting its other flip-flops to zero, by the fact that it incorporates a logic comparator which identifies, in a given part of an address sequence, series logic information provided by the bus if the said address sequence corresponds to the said displayed address, and which produces an identification logic signal, by the fact that it comprises a circuit for storing the identification signal, and by the fact that it comprises a gate permitting the loading in the memory of the data from the register when the output of the first control flip-flop and of the pointer are in the logic state "1", when a stored so-called identification signal is present and also a so-called end-of-sequence acceptance signal, which thus corresponds to the end of a data sequence following the said address sequence.

In one form of embodiment the register initialized between the address sequence and the data sequence by effecting a setting to the "1" state of the first flip-flop of the register and a resetting to zero of its other flip-flops when the output of the first control flip-flop is in the "1" state and the output of the pointer flip-flop in the "zero" state.

In a useful variant, the bus delivers, in accordance with the procedure described in the aforesaid European patent, starting and stopping information concerning a cycle of information provided by the bus with the aid of logic relations between the information and clock signals.

The circuit then comprises a third and a fourth control flip-flop which, when the interface circuit is in its first state, receive the clock signal at their input and are synchronized one by the information signal and the other by its inverse so that the output of the third flip-flop is changed to the "1" state by a first type of coincidence between the clock and information signals corresponding to the start of a so-called cycle, and the fourth flip-flop is changed to the "1" state by a second type of coincidence between the clock and information signals corresponding to the end of a cycle, the third flip-flop being reset to zero by the inverse of the clock signal and the fourth flip-flop by the output from the third, the output of the fourth flip-flop being designed so as to produce when in its logic "1" state, the initialization of the register by changing its first flip-flop to the "1" state and resetting its other flip-flops to zero.

The fourth flip-flop can with advantage be changed to the logic "1" state when no identification has been stored after an address sequence. To do so, the circuit is arranged so that the fourth flip-flop has its output changed to the logic "1" state when the stored identification signal is in the logic "0" state and when the first flip-flop has its output in the logic "1" state, this consequently producing initialization of the register.

The fourth flip-flop can likewise have its output changed to the logic "1" state in various configurations, particularly in the presence of a pulse produced by the pulse generator or when the outputs of the first and second flip-flops and the clock signal are together at the logic "1" level (end of cycle).

In one embodiment, the circuit for storing the identification signal comprises two inverting AND gates the output of one of which is looped to one of the inputs of the other and vice versa, the other input of the first of the two inverting AND gates receiving the inverse of the identification signal, but only if the pointer has its output in the logic "0" state and if the clock signal is in the logic "1" state, the other input of the second of the two inverting AND gates receiving the logic product of the inverses of the outputs of the third and the fourth flip-flop so as to permit the storage of the identification signal at each cycle.

For the purpose of conversing with the bus with a view to the acknowledgement of a data sequence following an address sequence, the circuit will with advantage incorporate an acknowledgement flip-flop timed by the clock signal and receiving at its input the logic product of the acknowledgement signal and the stored identification signal, and producing authorization signal at its output to the bus. This acknowledgement flip-flop may also be reset to zero by the said pulse. The said pulse may also reset the first control flip-flop to zero and change the fourth control flip-flop to the "1" state.

In an embodiment suitable for the case of a two-wire series bus, the circuit is characterized by the fact that it comprises two logic inputs capable of being linked in the first state of the circuit to a bus delivering an information signal and a clock signal, by the fact that the memory comprises a plurality of memory flip-flops, and by the fact that the first series of logic gates of the branching circuit comprises a third and a fourth inverting AND gate one of whose inputs is connected respectively to the output of two of the said memory flip-flops at the other input receives from the second decoder a signal with the logic level "1" in the first state of the circuit and zero in the second state, the output of the third and the fourth inverting AND gate being respectively connected to an input of a fifth and a sixth inverting AND gate whose output is connected to the first decoder, and by the fact that the other inputs of the fifth and sixth inverting AND gates receive the output from, respectively, an eighth and a ninth inverting AND gate validating the signals available at the logic inputs when the circuit is in its second state.

BRIEF DESCRIPTION OF THE FIGURES

The invention will be more readily understood when the description which follows, and which is given by way of non-exhaustive example, is read in conjunction with the Figures, which represent:

FIGS. 5a and 5b are respectively, a cycle delivered by the bus and a time-sequence diagram of the principal signals in FIG. 4.

DESCRIPTION OF A PREFERRED EMBODIMENT

Figure 1:
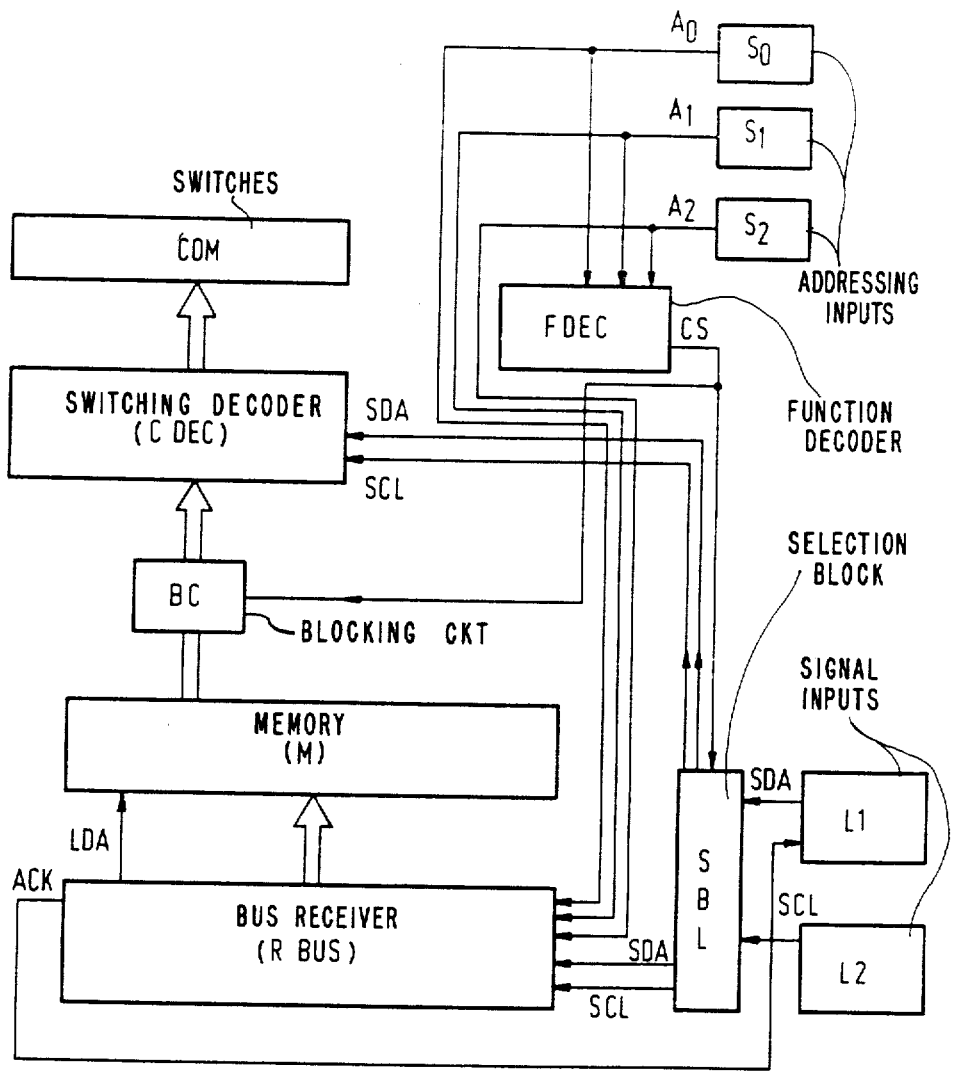
FIG. 1 is an overall diagram of a device according to the invention.

FIG. 1 gives an overall diagram of a device according to the invention. Here, the interface circuit comprises addressing inputs $S_0$, $S_1$ and $S_2$ each capable of being connected by wiring either to a given potential, e.g. the power-supply voltage of the circuit, or to earth so as to generate a three-bit address $A_0$, $A_1$ and $A_2$. Such an address may also be generated by a multistate logic and a decoder.

The displayed address, $A_0$, $A_1$ or $A_2$, is applied to the input of a function decoder FDEC producing at its output a state-of-operation signal CS. The generation of CS is predetermined by the intended operation of the associated circuit. For example it may be preprogrammed so that all addresses except one (e.g. 111) will correspond to the operation of the interface circuit on-line with a bus (first state), the remaining address (e.g. 111) corresponding to the operation of the circuit in a so-called off-line (second) state wherein control signals on certain of its inputs would operate without reference to the protocol on the bus. Such second state could also be selected by more than one value for the displayed address, the respective values then controlling respective different substates of the second state. If required the number of address bits could be higher or lower.

The signal CS is applied to a selection block SBL which also receives the signals SDA and SCL from inputs $L_1$ and $L_2$, respectively.

If the displayed address $A_0$, $A_1$, $A_2$ corresponds to operation on-line with a bus, the signals applied to inputs $L_1$ and $L_2$ represent an information signal SDA and a clock signal SCL. The selection block SBL directs the signals SDA and SCL towards a bus receiver RBUS intended particularly to check whether a coded address received from the bus corresponds or not to the displayed address $A_0$, $A_1$, $A_2$.

If the check is positive, and possibly subject to other logic operations, the bus receiver RBUS transmits an acknowledgement signal ACK on the bus and by means of a loading signal LDA controls the loading of data received from the bus in memory M. The memory M via a switching decoder CDEC controls a series of switches COM which have not been further detailed for brevity.

If the check is negative, it is assumed that another terminal to the bus is intended and bus receiver RBUS ceases being active: no memory loading is possible.

If the displayed address $A_0$, $A_1$ or $A_2$ corresponds to off-line operation, the signals applied to inputs $L_1$ and $L_2$ are control signals which are passed by selection block SBL directly to the switching decoder CDEC. This, inputs $L_1$ and $L_2$ are used for two different functions. This makes it possible for a single interface circuit, probably an integrated circuit, by simply displaying an address $A_0$, $A_1$, $A_2$ to meet all possible uses of a range of products. The most high-level products are controlled by a microprocessor via the bus and others directly.

The state-of-operation logic signal CS is also applied to a blocking circuit BC blocking the transfer of data from the memory M to the switching decoder CDEC when the displayed address $A_0$, $A_1$ or $A_2$ corresponds to off-line operation.

Figure 2:
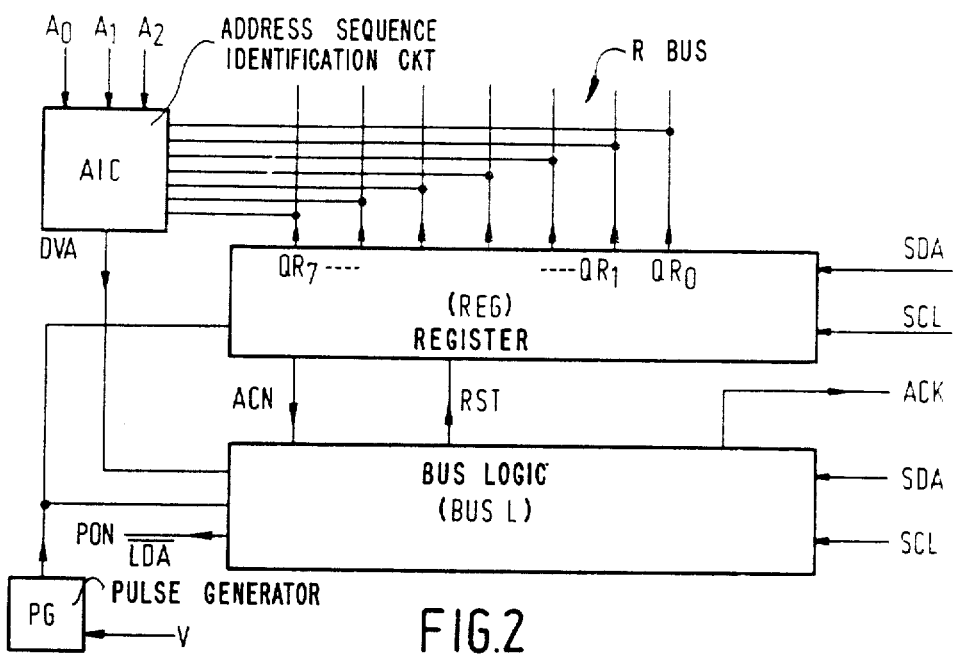
FIG. 2 is a diagram of the bus receiver in FIG. 1.

FIG. 2 shows a diagram of bus receiver RBUS of FIG. 1. Herein are contained a bus logic BUSL, a register REG and an address sequence identification circuit AIC.

The register REG receives the information signal SDA from the bus organized in cycles, each cycle presenting an address sequence and a data sequence, and furthermore a clock signal SCL.

The circuit AIC receives signals from the register REG and also the displayed address $A_0$, $A_1$, $A_2$. This circuit checks correspondance between the address received from the bus and the displayed address $A_0$, $A_1$, $A_2$. Furthermore this circuit checks for presence of a fixed-value flag which is transmitted in an address sequence to allow for detecting transmission errors. The circuit AIC sends a verification signal DVA to the bus logic BUSL.

The bus logic BUSL also receives the information signal SDA and the clock signal SCL, chiefly for recognizing the start and finish of each cycle. It also receives an end-of-sequence acknowledgement signal ACN from register REG when all the bits in a sequence have been received. The bus logic BUSL generates the following signals:

(a) a zero-resetting signal RST1 for register REG at the start of each sequence when the address is not recognized or absent;

(b) an acknowledge signal ACK to the bus (input $L_1$) confirming the acceptance of a sequence and authorizing the transmission of a next sequence;

(c) a signal LDA ordering the data from register REG to be loaded into the memory M.

Pulse generator PG upon connection of a power source to the circuit preferably produces an initialization pulse PON for the bus logic BUSL, the register REG, and the memory M.

Figure 3:
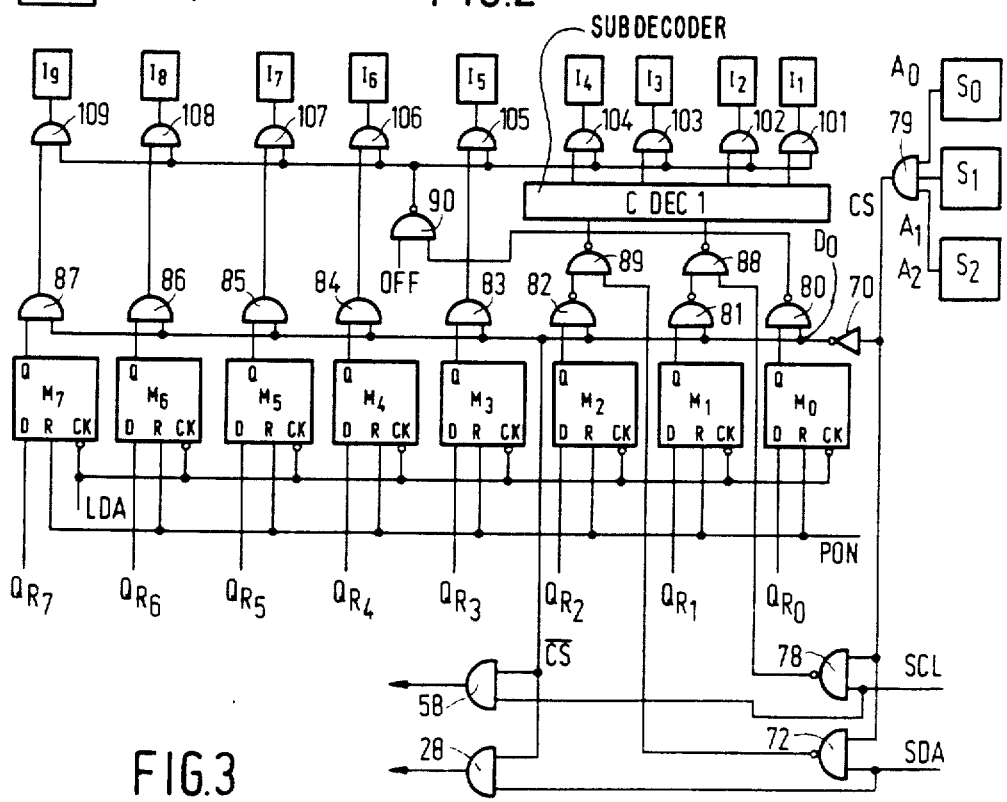
FIG. 3 is a form of embodiment of the selection logic SBL and the memory M in FIG. 1.

FIG. 3 shows an embodiment of selection logic SBL, memory M and several related subsystems. Memory M comprises eight D-type flip-flops $M_0$ to $M_7$, blocking circuit BC1 eight AND/NAND gates 80 to 87, the selection block SBL four NAND gates 72, 78, 88 and 89 and two AND gates 28 and 58. Function decoder FDEC consists of an AND gate 79. Control decoder CDEC comprises a subdecoder CDEC1 fed by flip-flops $M_1$, $M_2$. Furthermore there are direct interconnections from flip-flops $M_3 \ldots M_7$. Switching block COM consists of nine controlled switches $I_1$ to $I_9$. Each of the flip-flops $M_0$ to $M_7$ receives at its input D a respective output $QR_0$ to $QR_7$ from the register REG.

Figure 4:
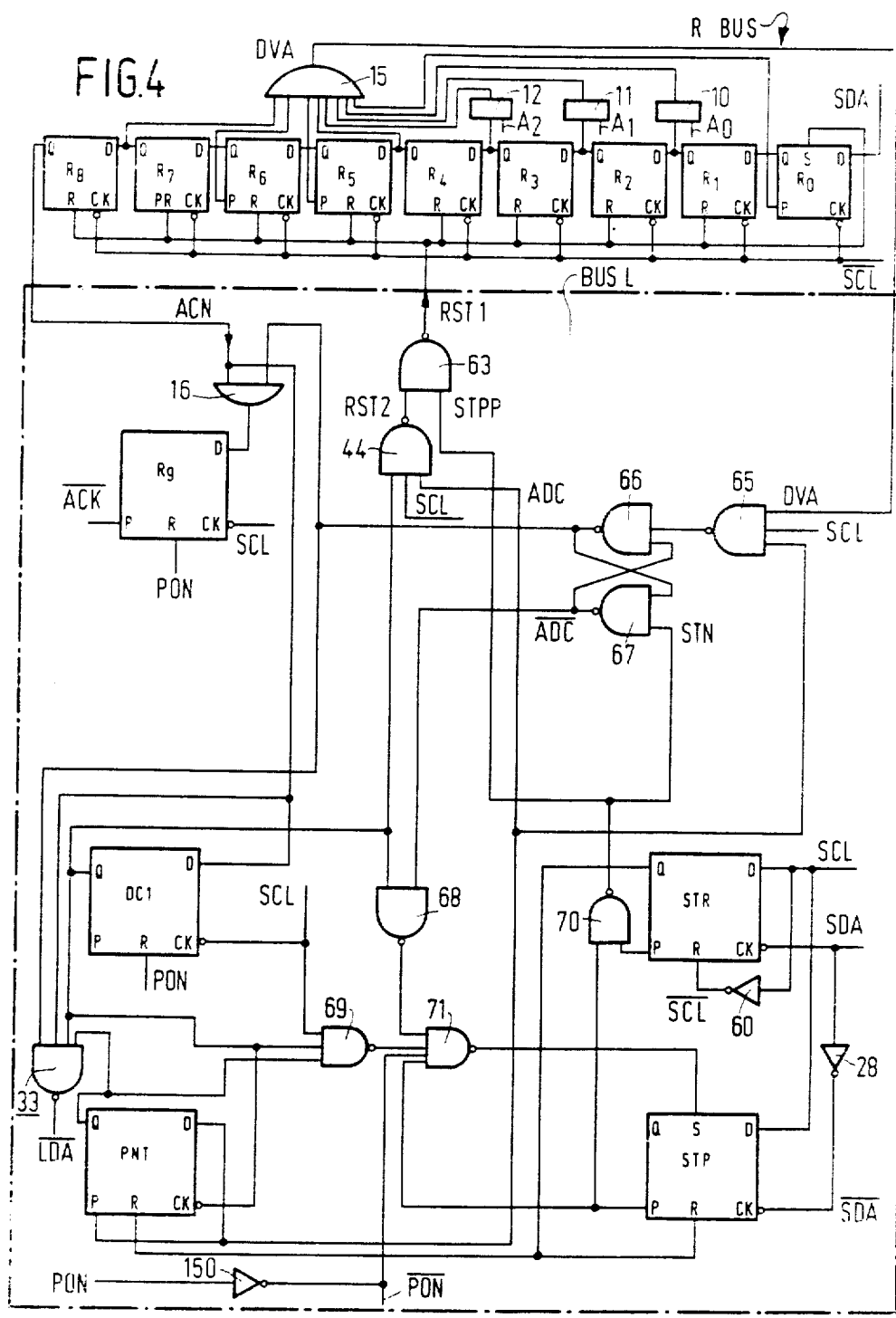
FIG. 4 is a form of embodiment of the bus receiver in FIG. 1.

As will be seen in FIG. 4, the latter may be formed by a shift register incorporating flip-flops $R_0$ to $R_7$ receiving information SDA in series. Each of the flip-flops $M_0$ to $M_7$ receives at its clock input CK the inverse $\overline{LDA}$ of the signal for loading data into the memory. The negative-going edge of signal $\overline{LDA}$ activates these CK inputs. Additionally, flip-flops $M_0 \ldots M_7$ receive the puls PON at their reset inputs. The address which would control OFF-line operation (here, arbitrarily $A_0 = A_1 = A_2 = 1$) is detected by AND gate 79 to produce the state-of-operation signal CS which is a "1" exclusively for the address 111 and a "0" otherwise.

Selection is effected in the following manner:

The signal CS, inverted by an invertor 70, is applied to AND gates 58 and 28, whose other inputs respectively receive the signal SCL and the signal SDA. For the seven displayed addresses corresponding to the first state, gates 58 and 28 allow the signal SCL and SDA to pass. The inverted signal $\overline{CS}$ is also applied to AND gates 83 to 87 and NAND gates 80 to 82. The other inputs of gates 80 to 87 receive the outputs Q from flip-flops $M_0$ to $M_7$, respectively. For the seven displayed addresses corresponding to the first state, gates 80 to 87 authorize the transmission of memory information in flip-flops $M_0$ to $M_7$ to the output of gates 80 to 87. The outputs of NAND gates 81 and 82, are connected to an input of two NAND gates 88 and 89, respectively, the other input of which is connected to the outputs of two NAND gates 78 and 72, respectively. NAND gate 78 receives at one input the signal SCL and at its other input signal CS, which is also applied to one of the inputs of the NAND gate 72. The other input of the latter receives signal SDA.

When CS=0 (first state), the outputs of gates 72 and 78 are in the "1" state and permit the passage of information from the output of gates 81 and 82 to the subdecoder CDEC1.

When CS=1 (second state), gates 28 and 58 are nonconducting and gates 72 and 78 permits the passage of logic signals SCL and SDA. A logic "1" from gates 81 and 82 and authorizes the passage of SCL and SDA through gates 88 and 89, so as to be applied directly to the decoder CDEC1.

Nine controlled switches $I_1$ to $I_9$ receive the outputs of nine AND gates 101 to 109, one input of the latter receiving the output from an inverting AND gate 90. The other inputs of AND gates 101 to 104 receive an output from the decoder CDEC1, and that of AND gates 105 to 109 the outputs from gates 83 to 87.

When the output of the NAND gate 90 is "1" (normal case, OFF=0), gates 101 to 109 authorize the operation of switches $I_1$ to $I_9$. In the first state, $M_1$ to $M_7$ control the switches $I_1$ to $I_9$ and, in the second state, the logic levels SCL and SDA applied directly to decoder CDEC1 control switches $I_2 \ldots I_4$, e.g. control the closure of one of them at a time. In a different use, the signals SCL and SDA could be multivalent and by means of level discriminators be converted to binary control signals. In still other applications, signals SDA, SCL could have analog values. flip-flop $M_0$ stores an authorization state $D_0$ for a command OFF. The output of NAND gate 80 is applied to an input of NAND gate 90 whose other input receives the command OFF. If $Q(M_0)=0$, the output of gate 80 is at "1" level and authorises the transmission of the command OFF via gate 90. The outputs of gates 101 to 109 are then at "0" and inhibit switches $I_1$ to $I_9$.

If CS=0 (first state), the output from gate 80 is selectively controlled by $Q(M_0)$. If CS=1 (second state) command "OFF" transmitted always.

Register REG is a shift register consisting of nine type D flip-flops $R_0 \ldots R_8$, loading upon a negative-going edge of signal $\overline{SCL}$ on their clock input CK. The flip-flop $R_0$ is set to the "1" state (input 5) and flip-flops $R_1$ to $R_8$ are reset to zero before each cycle by an initializing signal RST1 from NAND gate 63. This corresponds in time to the starting bit STA of the typical cycle shown in FIG. 5a. The shift register receives all bits in the address sequence A. This sequence is correctly positioned when the logic "1", introduced into $R_0$ at the time of the initialisation, reaches $R_8$. The bit $A_6 \ldots A_0$ are then stored in $R_7 \ldots R_1$. The bit W is still equal to zero. The bits $A_2$, $A_1$ and $A_0$ in the sequence are compared bit by bit with the corresponding bits in the displayed address by three EXCLUSIVE-NOR gates 10, 11, 12. If the address $A_0$, $A_1$, $A_2$ of the address sequence received ($Q_{R1}$, $Q_{R2}$, $Q_{R3}$) is identical to the displayed address, each of the gates 10, 11 and 12 delivers at its output a logic "1". In the embodiment shown in FIG. 4, it has also been assumed that the bits $A_6$, $A_5$, $A_4$ and $A_3$ form an identification which has the value 1001. Thus, the complete identification of an address sequence is done by multi-input AND gate 15 receiving the outputs $Q(R_7)$, $Q(R_4)$, the inverted outputs $P(R_5)$, $P(R_6)$, the outputs from gates 10, 11, 12 and, preferably, also $P(R_0)$. In this way identification signal DVA is produced. Thus, gates 10, 11, 15 form the address identification circuit AIC. Output $Q(R_8)$ produces an end-of-sequence acceptance signal ACN. The signal W which follows $A_0$ is always a zero. In the way described, there are eight different combinations for $A_0 \ldots A_2$. At least one thereof would always control the OFF-line state. Each of the others could be programmed to represent the address of the actual circuit. Thus, up to seven circuits of the same functional type may be addressed individually in the ON-line state. The difference with other circuit types would reside in the address bits $A_3 \ldots A_6$.

The lower part of FIG. 4 enclosed by a dot-dash line forms the bus logic BUSL. It comprises a first control flip-flop DC1 receiving at its input D the signal ACN from output Q of $R_8$, and at its clock input CK the clock signal SCL; and a second control or pointer flip-flop PNT, whose inverting output P is looped to its input D, its clock input CK being connected to the output Q of the flip-flop DC1. The pointer flip-flop PNT indicates whether an address or data is presently received within a cycle.

A third control flip-flop STR and a fourth control flip-flop STP control the start and end of a cycle. The bus indicates the start of a cycle (see FIG. 5b) by a transition from level "1" to level "0" of the signal SDA when the clock signal SCL is at the level "1", and the end of a cycle by a transition from the level "0" to the level "1" of the signal SDA when the clock signal SCL is at the level "1". Otherwise, transitions between successive information bits of the signal SDA take place when the clock signal SCL is at the logic "0" level. The fourth flip-flop STP indicates whether the circuit is in an active or inactive state in relation to the bus. In the latter case, its output initializes the register R.

The third flip-flop STR receives the clock signal SCL at its input D and is clocked at input CK by the signal SDA to detect the start of a cycle, whereas the fourth flip-flop STP receives the clock signal SCL at its input D and at its timing input CK the inverted signal $\overline{SDA}$ via invertor 28, to detect the end of a cycle. The output Q from the third flip-flop STR is taken to the reset input R of the pointer flip-flop PNT and of the fourth flip-flop STP. The third flip-flop STR is reset by the inverse clock signal $\overline{SCL}$ from invertor 60. The authorization signal DVA produced by gate 15 is stored by a flip-flop RS consisting of two cross-coupled NAND gates. This storage is authorized by a NAND gate 65 and takes place when DVA=1, SCL=1 and PNT Q (output of the pointer) =0. This last condition inhibits any accidental identification of a data sequence part of a cycle. The second input of NAND gate 67 receives a signal STN from AND gate 70 whose inputs are connected to the inverting outputs P of the control flip-flops STR and STP. As long as STN=1, the signal DVA, which is transient, will remain as signal ADC at the output of gate 66. The return of STN to the state "0" deletes this storage. flip-flops $R_0$ to $R_8$ are initialized by signal RST1 from NAND gate 63 which receives at one input the output signal STN from the AND gate 70 (initialization when STRQ or STPQ=1), and at its other input a signal RST2 from NAND gate 44. The latter receives at its three input the clock signal SCL, the output Q from the first control flip-flop DC1, and the inverted output P from the pointer flip-flop PNT.

The flip-flops $R_0$ to $R_8$ are initialized when the flip-flop STP stores an inactive state of the circuit (STPP), between an address sequence and a data sequence (RST2), and also at the start of a cycle (AND gate 70).

A flip-flop $R_9$ generates at its output P an inverted authorization logic signal $\overline{ACK}$, which means that acceptance corresponds to a logic "0". The flip-flop $R_9$ is clocked by signal SCL and receives at its input D the output from an AND gate 16, one input of which receives the end-of-sequence acceptance signal ACN and the other the stored identification signal ADC.

The loading of memory flip-flops $M_0$ to $M_7$ is obtained by a negative-going signal $\overline{LDA}$ applied to their loading-authorization inputs CK. The signal $\overline{LDA}$ is obtained from NAND gate 33 whose inputs receive the end-of-sequence acceptance signal ACN, the stored identification signal ADC, and the outputs Q of the first flip-flop DC1 and the pointer flip-flop PNT. Loading is thus authorized when an end of a data sequence has been detected while, previously, an address sequence corresponding to that displayed by the circuit has been identified.

The fourth flip-flop STP is changed to the state "1" by the output from NAND gate 71 which has four inputs. Its first input receives the inverted output P from STP (self-maintenance of the state "1" by STP) and its second input the inverse signal $\overline{PON}$ (STP being placed in the state "1" by the first application of voltage). Its third input receives the output from NAND gate 69 whose inputs are SCL, the output Q from DC1, and the output Q from the pointer flip-flop PNT (changed to the state "1" of STP at the end of the cycle, even in the event of failure of the bus). Its fourth input receives the output from NAND gate 68 whose inputs are the output Q from DC1 and the inverse $\overline{ADC}$ of ADC, which is available at the output of NAND gate 67 changed to the state "1" of STP if, by the end of an address sequence, no identification signal has been produced and stored). The pulse PON also resets (input R) the first control flip-flop DC1 and flip-flop $R_9$.

Figure 5A:
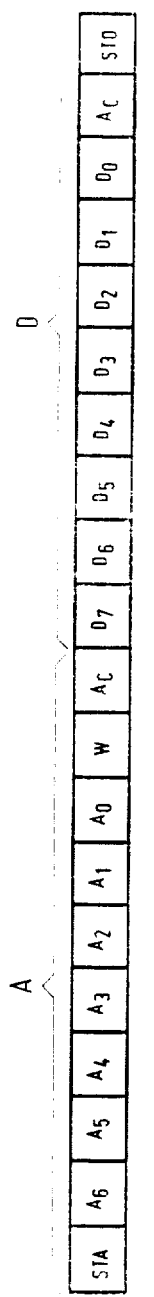
Figure 5A:
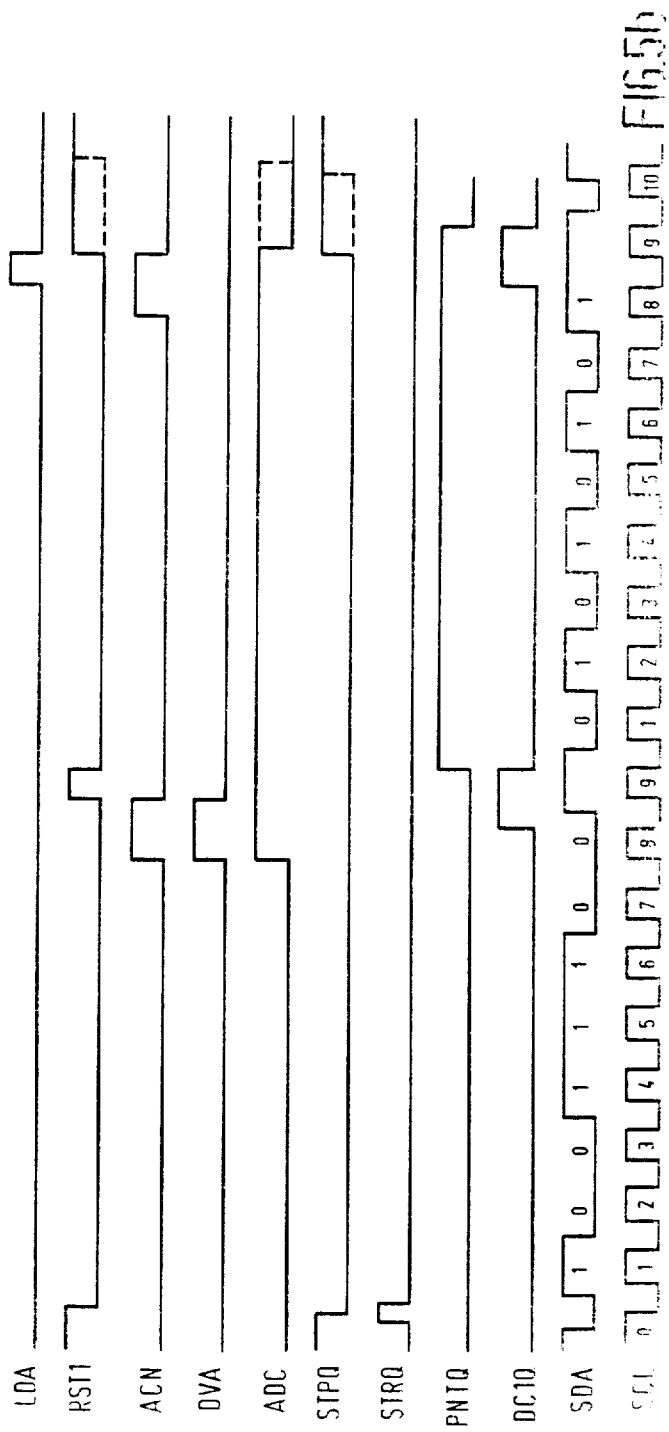

With reference to FIGS. 5a and 5b the operation of the circuit upon an information cycle provided by the bus in case of correspondence between the displayed address $A_0$, $A_1$, $A_2$ and the externally received address is given.

The starting condition STA is a negative-going edge of SDA with SCL=1. This is detected by STR whose output STRQ changes to the state "1" whereupon STP and PNT are reset and ADC becomes zero because STN=0 and DVA=0. At that moment the output P of STP changes to "1" (STPQ=0) and RST1 also to "0". Thanks to the previous initialization, flip-flop $R_0$ is at the moment in the state "1", and the flip-flops $R_1$ to $R_8$ in the state "0". The output Q from STR is changed back to zero by the negative-going edge of the starting clock puls SCL. The bus transmits the address sequence A until $R_8$ receives the logic "1" stored in $R_0$ at the moment of initialisation, resulting in ACN=1 on the positive-going edge of the 8th clock pulse. The bits $A_6$ ... $A_0$ are then located in $R_7$ ... $R_1$, and W=0 (by convention) in $R_0$. The address transmitted by the bus corresponding to that displayed by the circuit, the AND gate 15 transmits DVA=1, which is authorized by gate 65 because the output P from the pointer PNT is in the "1" state starting from the 8th clock pulse SCL. ADC changes to the state "1". At the next clock pulse DVA again changes to "0" but ADC remains at the level "1" because the outputs P from STR and STP are both at the level "1", hence STN=1.

The simultaneous presence of ACN and ADC, detected by gate 16, produces at the output P of $R_9$ signal $\overline{ACK}$ on the negative-going edge of the 8th clock pulse, the latter being erased by the negative-going edge of the 9th clock pulse because the output of gate 16 at that moment is at zero: ACK is therefore identical to ACN but delayed by half a clock pulse. It is therefore present when the clock is at its high level for the ninth pulse, hence in the space provided for that purpose between the address sequence A and the data sequence D. The way in which the bus system deals with this signal ACK is described in the cited European Pat. No. 51332. The signal ACN also sets the flip-flop DC1 (DC1Q) to the state "1" upon the negative-going edge of the 8th clock pulse DC1Q changes back to zero on the negative-going edge of the 9th clock pulse because ACN has changed back to zero on the positive-going edge of this same clock pulse. This negative-going edge of DC1Q causes the output of the pointer PNT to change to the state "1" (PNTQ=1). The pointer PNT thus notes the fact that the data sequence D of the cycle is now about to be received.

For the duration of the 9th clock pulse SCL=1, DC1Q=1 and PNTQ=0, hence RST=1, which causes the initialization of register R, $R_0$ being in the state "1" and $R_1$ to $R_8$ in the state "0". The arrival of the data sequence thus occurs with ADC=1 and PNT=1. Just as during the reception of the address sequence A, $R_0$ is initialized to the "1" state. This "1" is shifted to flip-flop $R_8$ whereupon ACN=1 upon the positive-going edge of the eighth close pulse. ACN returns to 0 on the positive-going edge of the next clock pulse. Bits $D_7$ ... $D_0$ are then stored in $R_7$ ... $R_0$. Then DC1Q=1 on the negative-going edge of the 8th clock pulse in the sequence D, DC1Q returning to 0 on the negative-going edge of the next clock pulse.

Between the negative-going edge of the 8th clock pulse of the sequence D and the next positive-going edge, simultaneously DC1Q=PNTQ=ACN=ADC=1, hence LDA=1 for the duration of half a clock pulse. The contents of $R_0$ to $R_7$ are transferred in parallel into the memory flip-flops $M_0$ to $M_7$. $M_0$ receives from $R_0$ the bit $D_0$, a "0" enabling the command OFF at the input of gate 90 (FIG. 3).

The open or closed position of switches $I_1$ to $I_9$ is then updated in accordance with the new contents of bits $M_0$ to $M_7$ if the control OFF is inactive, or inhibited by $D_0$.

Just as for the address sequence A, $R_9$ produces a signal ACK=1 between the negative-going edge of the 8th and that of the 9th clock pulse in the sequence D. The change to zero of DC1Q on the negative-going edge of the 9th clock pulse in the sequence D resets pointer flip-flop (PNPQ=0). At the end of the cycle the bus transmits an "off" signal formed by a positive-going edge SDA on a clock signal SCL at the level "1", resulting in STPQ=1, hence STN=0, therefore ADC=0, and RST1=1 (initialization of register R).

In a modified embodiment, the interface circuit deals with the situation wherein this "off" signal is not produced. To that end, advantage is taken of the fact that, in the terminal phase of a cycle, a transitory situation occurs in which DC1Q=PNTQ=1. The gate 69 then switches flip-flop STP to state "1" (STPQ=1) on the positive-going edge of the 9th clock pulse in the sequence D.

The "off" signal delivered by the bus consists of a positive-going edge on the signal SDA while SCL=1 on the 10th clock pulse in the sequence D. It is detected by the flip-flop STP which changes to the state "1" (STPQ=1), in the circuit variants not incorporating a gate 69. This is represented by dashes in FIG. 5b, and also applies to signals ADC and RST1.

The invention is not restricted to the embodiments shown. Thus, the inverted output P of the control flip-flop STR may be connected directly to the corresponding input of the NAND gate 63, the use of the AND gate 70 nevertheless giving the advantage of initialising the register REG in the event of the unwanted presence of a coincidence corresponding to the start of a cycle, while such a cycle is actually in progress. On the other hand, all type D flip-flops in the described embodiments load on a negative-going edge on their timing input CK. Flip-flops loading on a positive-going edge could also be employed.

The circuit described may form part of a larger circuit, for example an IC-subsystem.

What is claimed is:

1. A slave station interface circuit comprising;

a serial bus input for receiving a synchronous information bit string (L1, L2);

address input means (S) . . . S2) for receiving a preset fixed multi-bit address (A0 . . . A2):

function decoder means (FDEC) fed by said address input means for outputting an on-line control signal in response to any one of a plurality of first preset address values and outputting an off-line control signal in response to at least one of second preset address values;

selection block logic means (SBL) fed by said function decoder means for coupling said bus input to a bus receiver means (RBUS) in response to said on-line control signal;

said bus receiver means being fed by said address input means and having address recognition means for comparing an address bit string in said information bit string to said preset address for conditionally producing an activation signal in response to a detected equality and outputting predetermined information signals received on said serial bus input after said address bit string on its output means in response to said activation signal;

blocking means fed by said output means for being controlled in a transmissive state by said on-line control signal but by said off-line control signal in a blocking state; and a switching decoder (CDEC) fed by said blocking means and said selection block logic means for in said transmissive state receiving said predetermined information signals, but unconditionally receiving said complete information bit string directly from said selection block logic means in response to said off-line state, said switching decoder having second output means for outputting binary decoded signals based on information received by said switching decoder.

2. An interface circuit as claimed in claim 1, wherein said blocking means comprises a first array of logic gates (80 . . . 87) for receiving said first control signal and in parallel selectively controlling said transmission and a second array of logic gates (101 . . . 109) for receiving said second control signal and being arranged in series with said first array for in parallel selectively inhibiting outputting of any switch control signal.

3. An interface circuit as claimed in claim 1, wherein said switching decoder comprises a subdecoder (CDEC1) for at least in said blocking state decoding a signal arriving at said first input to a plurality of binary control signals presentable at said output means.

4. A circuit as claimed in claim 1, wherein said bus receiver is provided with an address decoder (15) said address decoder having a first plurality of inputs for recognizing predetermined address bits received on said first input as corresponding to associated fixed-value address bits, and having a second plurality of inputs for recognizing further predetermined address bits received in said first input as corresponding to an associated value of said displayed address that is different from the value controlling said second state.

5. A circuit as claimed in claim 1, in which is incorporated a pulse generator (PG) which, when the circuit is switched on, generates a pulse (PON) causing the initialization of the memory means (M) and of at least a part of the bus receiver means.

6. A slave station interface circuit comprising:
a serial bus input for receiving a synchronous information bit string (L1, L2);

address input means (S) . . . S2) for receiving a preset fixed multi-bit address (A0 . . . A2):

function decoder means (FDEC) fed by said address input means for outputting an on-line control signal in response to any one of a plurality of first preset address values and outputting an off-line control signal in response to at least one of second preset address values;

selection block logic means (SBL) fed by said function decoder means for coupling said bus input to a bus receiver means (RBUS) in response to said on-line control signal;

said bus receiver means being fed by said address input means and having address recognition means for comparing an address bit string in said information bit string to said preset address for conditionally producing an activation signal in response to a detected equality and outputting predetermined information signals received on said serial bus input after said address bit string on its output means in response to said activation signal;

blocking means fed by said output means for being controlled in a transmissive state by said on-line control signal but by said off-line control signal in a blocking state; and a switching decoder (CDEC) fed by said blocking means and said selection block logic means for in said transmissive state receiving said predetermined information signals, but unconditionally receiving said complete information bit string directly from said selection block logic means in response to said off-line state, said switching decoder having second output means for outputting binary decoded signals based on information received by said switching decoder, in which said bus receiver means is a shift register ($R_0 \ldots R_7$) for receiving at a series input logic information elements (SDA) from the bus in the form of cycles each presenting at least one sequence of information elements and synchronized by a bus clock signal (SCL), and producing at a downstream output $QR_8$) an end-of-sequence acceptance signal (ACN) applied to the input (D) of a first control flip-flop (DC1) clocked by said clock signal (SLC) and whose output (Q) clocks a second control flip-flop called a pointer (PNT) having the inverse of its output (P) coupled to its input (D), in which the presence of a logic level "1" at the output (Q) of the first flip-flop (DC1) and at the output (P) of the pointer (PNT) permits the initialization of said bus receiver means, by the setting to state "1" of its first flip-flop and the resetting to zero of its other flip-flops, in which is incorporated a logic comparator (10, 11, 12) which, in a given part of an address sequence, identifies logic information transmitted in series by the bus if the said address sequence corresponds to said preset fixed address, and which produces an identification logic signal (DVA), in which is incorporated a circuit (66, 67) to store the said identification signal (DVA), and in which is also incorporated an AND gate (33) permitting the loading into a memory means (M) of the data from the bus receiver means when the output (Q) of the first control flip-flop (DC1) and of the pointer (PNT) are in the logic state "1", when a said stored identification signal (ADC) is present as well as said end-of-sequence acceptance signal (ACN), which thus corresponds to the end of a data sequence following the said address sequence.

7. An interface circuit as claimed in claim 6, in which the configuration produces said initialization by the changing to state "0" of the first flip-flop ($R_0$) of the register means (R) and the resetting to zero of its other flip-flops ($R_1 \ldots R_8$) when the output of the first control flip-flop (DC1) is in the state "1" and the output (Q) of the pointer (PNT) in the state "0".

8. An interface circuit as claimed in claim 6, in which are incorporated a third (STR) and a fourth (STP) control flip-flop which in the first state receive at their input (D) the clock signal (SCL) and are timed (CK) one by the information signal (SDA) and the other by its inverse ($\overline{SDA}$) so that the output (Q) of the third flip-flop (STR) is changed to the state "1" by a first type of coincidence between the clock (SCL) and information (SDA) signals corresponding to the start of said cycle, and the fourth flip-flop (STP) is changed to the state "1" by a second type of coincidence between the clock (SCL) and information (SDA) signals corresponding to the end of a cycle, the third flip-flop (STR) being reset to zero by the inverted clock signal ($\overline{SCL}$) and the fourth flip-flop (STP) by the output (Q) of the third flip-flop (STR), the output (Q) of the fourth flip-flop (STP) producing, when in the logic state "1", a change to state "1" of the first flip-flop ($R_0$) of the bus receiver means and the resetting to zero of its other flip-flops ($R_1 \ldots R_8$).

9. An interface circuit as claimed in claim 8, in which the fourth flip-flop (STP) has its output set to the logic state "1" when the stored identification signal (ADC) is in the logic state "0" and when the first flip-flop (DC1) has its output at the logic state "1".

10. An interface circuit as claimed in claim 6, in which the circuit for storing the identification signal (DVA) comprises two mutually cross-coupled NAND gates (66, 67), the first thereof (66) receiving the inverted identification signal ($\overline{DVA}$) under condition of the pointer (PNT) having a "0" output and the clock signal being at logic "1", the second of the two NAND gates (67) receiving the logic product of the inverted (P) outputs of the third (STR) and fourth (STP) flip-flops, to permit the storage (ADC) of the identification signal (DVA) at each cycle.

11. An interface circuit as claimed in claim 8, in which is incorporated a pulse generator (PG) which, when the circuit is switched on, generates a pulse (PON) causing the initialization of the memory means (M) and of at least part of the bus receiver means, and in which the fourth flip-flop (STP) by said pulse is driven to its self-maintaining "1" state.

12. An interface circuit as claimed in claim 9, in which the fourth flip-flop (STP) also has its output changed to the logic state "1" when the outputs from the first (DC1) and second (PNT) flip-flop and the clock signal (SCL) are all at the logic "1".

13. An interface circuit as claimed in claim 6, in which is incorporated an acceptance flip-flop ($R_9$) timed by the clock signal (SCL) and receiving at its input the logic product of the acceptance signal (ACN) and the stored identification signal (ADC), and producing at its output an authorization signal (ACK).

14. An interface circuit as claimed in claim 13, in which is incorporated a pulse generator (PG) which, when the circuit is switched on, generates a pulse (PON) causing the initialization of the memory means (M), and of at least part of the bus receiver means, and wherein said pulse resets the acceptance flip-flop ($R_9$) to zero.

15. An interface circuit as claimed in claim 14, wherein said pulse resets the first control flip-flop (DC1) to zero and sets the fourth control flip-flop (STP) to "1".

16. An interface circuit as claimed in claim 8, in which the bus receiver means is initialized when at least either of the third (STR) and fourth (STP) control flip-flops has its output (Q) in the state "1".

17. An interface circuit as claimed in claim 1, in which are incorporated two logic inputs $L_1$, $L_2$) capable of being connected in the first state of the circuit to a bus delivering an information signal (SCL) and a clock signal (SDA), and in which the memory means (M) comprises a plurality of memory flip-flops ($M_0 \ldots M_7$), in which the first array of logic gates (80 ... 87) of the selection block logic means (SBL) comprises a third and a fourth NAND gate (81, 82), one input of each of which is connected respectively to the output of a first and second memory flip-flop ($M_1$, $M_2$) and the other input of which receives from the function decoder (FDEC) a signal ($\overline{CS}$) with a logic level "1" in the first state of the circuit and "0" in the second state of the circuit, the output from the third and fourth NAND gates being connected respectively to an input of a fifth (88) and a sixth (89) NAND gate whose output is connected to the control decoder (CDEC), and in which the other input of the fifth (88) and sixth (89) NAND gates receives the output from, respectively, an eighth (78) and a ninth (72) NAND gate enabling the signals (SCL, DSA) available at the logic inputs ($L_1$, $L_2$) when the circuit is in its second state.

18. An interface circuit as claimed in claim 6, wherein said blocking means comprises a first array of logic gates (80 ... 76) for receiving said control selection signal and in parallel selectively controlling said transmission and a second array of logic gates (101 ... 109) for receiving an "OFF" control signal and being arranged in series with said first array for in parallel selectively inhibiting outputting of any switch control signal, in which said first array of logic gates (80 ... 87) includes a tenth NAND gate (80) one input of which is connected to the output of a third memory flip-flop ($M_0$) and the other input receives from the function decoder means (FDEC) a signal ($\overline{CS}$ with a logic level "1" in the transmission state and "0" in the blocking state, and whose output is connected to the input of a switch-off enabling gate (90) so that the switching-off logic signal (OFF) is enabled or not in accordance with the contents of the third memory flip-flop ($M_0$) in the circuit in its transmissive state and is always enabled in the blocking state.

* * * * *